United States Patent
Ng et al.

(10) Patent No.: US 9,792,712 B2
(45) Date of Patent: Oct. 17, 2017

(54) COMPUTATIONAL PIPELINE AND ARCHITECTURE FOR MULTI-VIEW DISPLAYS

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 15/184,874

(22) Filed: Jun. 16, 2016

(65) Prior Publication Data
US 2016/0371866 A1 Dec. 22, 2016

Related U.S. Application Data

(60) Provisional application No. 62/180,300, filed on Jun. 16, 2015.

(51) Int. Cl.
 *G09F 19/14* (2006.01)
 *G06T 11/60* (2006.01)
 (Continued)

(52) U.S. Cl.
 CPC ............... *G06T 11/60* (2013.01); *G06T 7/90* (2017.01); *G09F 19/14* (2013.01); *G09G 3/006* (2013.01);
 (Continued)

(58) Field of Classification Search
 CPC .......... H04N 13/0445–13/045; H04N 2013/0461–2013/0465; G09F 19/14; G09G 2320/028; G09G 2340/10
 See application file for complete search history.

(56) References Cited

U.S. PATENT DOCUMENTS

| | | | | | |
|---|---|---|---|---|---|
| 5,855,425 | A | * | 1/1999 | Hamagishi | G02B 27/2214 348/E13.029 |
| 6,339,421 | B1 | | 1/2002 | Puckeridge | |

(Continued)

FOREIGN PATENT DOCUMENTS

| | | |
|---|---|---|
| EP | 2685735 A1 | 1/2014 |
| WO | 0224470 A | 3/2002 |
| WO | 2013183108 A1 | 12/2013 |

OTHER PUBLICATIONS

Authorized Officer: Mehrdad Dastouri, "International Preliminary Report on Patentability" dated Feb. 3, 2017 issued in PCT International Application PCT/US16/14122, 21 pp.

(Continued)

*Primary Examiner* — Gregory J Tryder
*Assistant Examiner* — Diane Wills
(74) *Attorney, Agent, or Firm* — Kaplan Breyer Schwarz, LLP

(57) ABSTRACT

A multi view display is a display capable of simultaneously showing different images to viewers that see the display from different locations. Viewers do not see the images intended for other viewers at other locations. A multi view display forms images via a collection of multi-view pixels. A multi-view pixel is able to emit different light in different directions; in each direction, parameters of emitted light such as brightness, color, etc., can be controlled independently of the light emitted in other directions. Embodiments of the present invention comprise a computational pipeline and architecture for efficiently distributing image data to the multi-view pixels of a multi-view display.

16 Claims, 7 Drawing Sheets

(51) Int. Cl.
*G09G 3/00* (2006.01)
*H04N 13/04* (2006.01)
*G06T 7/90* (2017.01)

(52) U.S. Cl.
CPC ... *H04N 13/0447* (2013.01); *G09G 2320/028* (2013.01); *G09G 2330/12* (2013.01); *G09G 2340/10* (2013.01)

(56) References Cited

U.S. PATENT DOCUMENTS

| | | | |
|---|---|---|---|
| 7,602,395 B1 * | 10/2009 | Diard | G06T 1/20 345/502 |
| 7,990,498 B2 | 8/2011 | Hong | |
| 8,461,995 B1 | 6/2013 | Thornton | |
| 9,080,279 B2 | 7/2015 | Jun et al. | |
| 9,715,827 B2 | 7/2017 | Ng et al. | |
| 9,743,500 B2 | 8/2017 | Dietz et al. | |
| 2003/0115096 A1 | 6/2003 | Reynolds et al. | |
| 2003/0156260 A1 | 8/2003 | Putilin et al. | |
| 2005/0195330 A1 | 9/2005 | Zacks et al. | |
| 2009/0273486 A1 | 11/2009 | Sitbon | |
| 2010/0085517 A1 | 4/2010 | Hong | |
| 2010/0207961 A1 | 8/2010 | Zomet | |
| 2010/0214537 A1 | 8/2010 | Thomas | |
| 2011/0159929 A1 | 6/2011 | Karaoguz et al. | |
| 2011/0216171 A1 | 9/2011 | Barre et al. | |
| 2011/0242298 A1 | 10/2011 | Bathiche et al. | |
| 2011/0304613 A1 | 12/2011 | Thoresson | |
| 2012/0026157 A1 | 2/2012 | Unkel et al. | |
| 2012/0105445 A1 * | 5/2012 | Sakai | H04N 13/0452 345/419 |
| 2012/0218253 A1 | 8/2012 | Clavin | |
| 2013/0093752 A1 | 4/2013 | Yuan | |
| 2013/0114019 A1 | 5/2013 | Ijzerman et al. | |
| 2014/0015829 A1 | 1/2014 | Park et al. | |
| 2014/0111101 A1 | 4/2014 | McRae | |
| 2015/0020135 A1 | 1/2015 | Frusina et al. | |
| 2015/0042771 A1 | 2/2015 | Jensen et al. | |
| 2015/0049176 A1 | 2/2015 | Hinnen et al. | |
| 2015/0062314 A1 | 3/2015 | Itoh | |
| 2015/0198940 A1 | 7/2015 | Hwang et al. | |
| 2015/0334807 A1 | 11/2015 | Gordin et al. | |
| 2016/0012726 A1 | 1/2016 | Wang | |
| 2016/0210100 A1 | 7/2016 | Ng et al. | |
| 2016/0212417 A1 | 7/2016 | Ng et al. | |
| 2016/0224122 A1 | 8/2016 | Dietz et al. | |
| 2016/0227201 A1 | 8/2016 | Ng et al. | |
| 2016/0261837 A1 | 9/2016 | Thompson et al. | |
| 2016/0261856 A1 | 9/2016 | Ng et al. | |
| 2016/0293003 A1 | 10/2016 | Ng et al. | |
| 2016/0341375 A1 | 11/2016 | Baker | |
| 2016/0341377 A1 | 11/2016 | Eddins | |
| 2016/0366749 A1 | 12/2016 | Dietz et al. | |
| 2017/0205889 A1 | 7/2017 | Ng et al. | |

OTHER PUBLICATIONS

"Non-Final Office Action", dated Mar. 22, 2017, Issued in related U.S. Appl. No. 15/002,164, 28 pp.

Officer: Jeffrey Harold, "International Preliminary Report on Patentability", Completed Mar. 20, 2017, Issued in International Patent Application PCT/US2016/020784, 6 pp.

"Non-Final Office Action", dated Mar. 24, 2017, Issued in related U.S. Appl. No. 15/002,175, 26 pp.

"Non-Final Office Action", U.S. Appl. No. 15/002,158, dated Mar. 3, 2017, p. 19.

"Non-Final Office Action", dated Jan. 26, 2017, issued in U.S. Appl. No. 15/088,912.

"Non-Final Office Action" dated Jan. 31, 2017, Issued in U.S. Appl. No. 15/180,341.

Officer: Patricia Stein, "International Search Report and Written Opinion", dated Jun. 3, 2016, issued in related PCT Application: PCT/US2016/04122.

Officer: Patricia Stein, "International Search Report and Written Opinion", dated May 12, 2016, issued in related PCT Application: PCT/US2016/020784.

Authorized Officer: Jacinta Molloy, "International Search Report and Written Opinion" dated Sep. 29, 2016 issued in PCT Application No. PCT/US2016/037185.

"Office Action" dated Oct. 6, 2016 issued in U.S. Appl. No. 15/060,527.

"Non-Final Office Action", U.S. Appl. No. 15/060,527, dated May 19, 2017, 13 pp.

"Non-Final Office Action", Related U.S. Appl. No. 15/015,099, dated May 4, 2017, 9 pp.

"Notice of Allowance and Fees Due", U.S. Appl. No. 15/180,341, dated Jul. 11, 2017, 7 pp.

* cited by examiner

System 100 for Operating a Single Conventional Electronic Display

Principle of Image Projection 200

Multi-View Display 400

One Multi-View Pixel 430 in Multi-View Display 400

Array 600 of Multi-View Pixels in a Multi-View Display

System 700 for Distributing Data to a Plurality of Multi-View Pixels

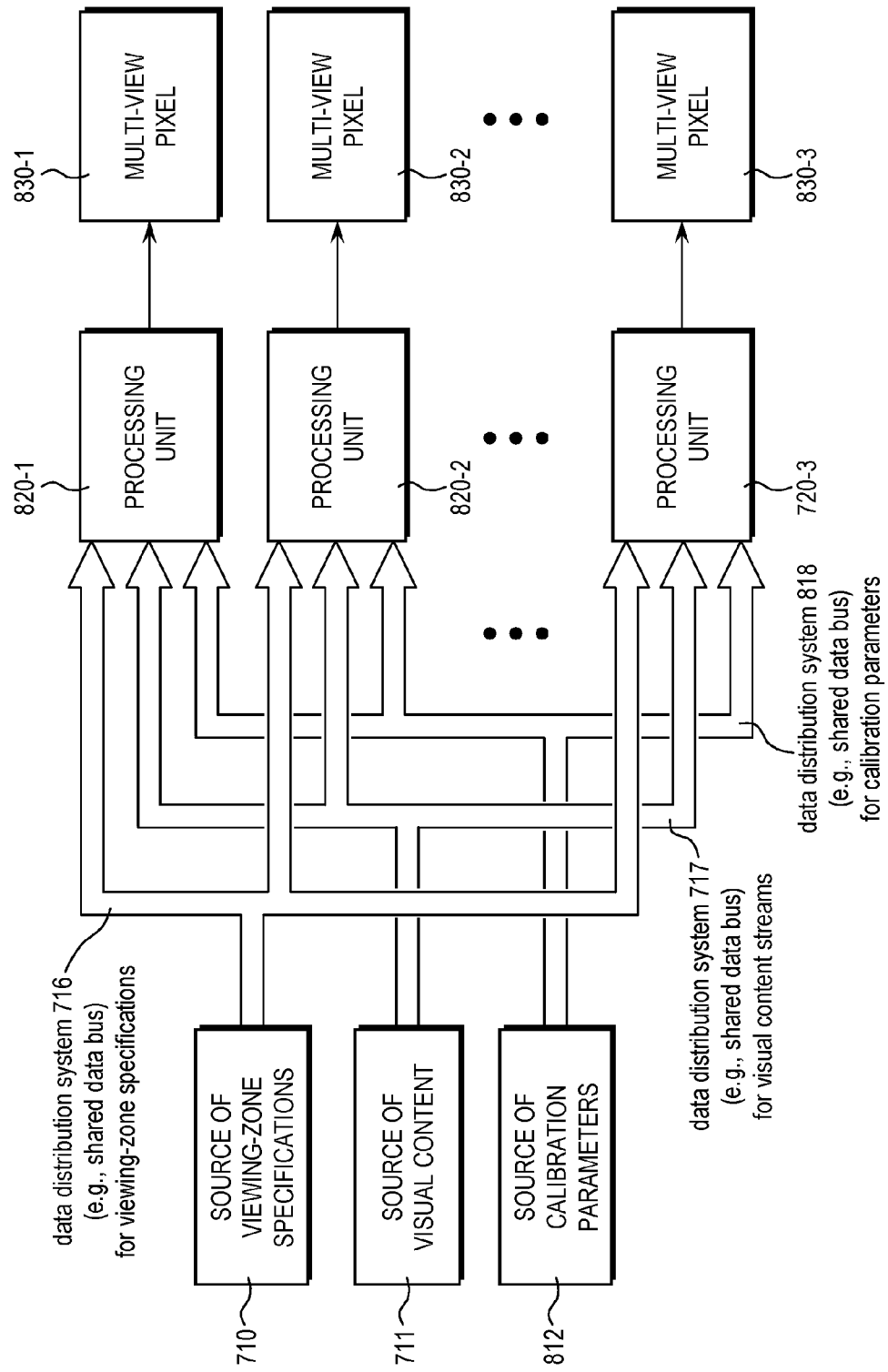

COMPUTATIONAL PIPELINE AND ARCHITECTURE FOR MULTI-VIEW DISPLAYS

CROSS REFERENCE TO RELATED APPLICATIONS

The underlying concepts, but not necessarily the language, of the following case are incorporated by reference:
(1) U.S. provisional application No. 62/180,300.
If there are any contradictions or inconsistencies in language between this application and one or more of the cases that have been incorporated by reference that might affect the interpretation of the claims in this case, the claims in this case should be interpreted to be consistent with the language in this case.

This case claims benefit of the following provisional application:
(1) U.S. provisional application No. 62/180,300.

FIELD OF THE INVENTION

The present invention relates to electronic displays, and, more particularly, to electronic displays intended for simultaneously displaying multiple distinct images.

BACKGROUND

Ever since antiquity, people have created pictures. In ancient times, pictures were exclusively static pictures generated, for example, by painting, or drawing on a surface. In modern times, photography has provided the ability of creating pictures through technological tools, and cinematography has provided the ability to create moving pictures, first in black and white and, later, in color. More recently, electronic displays, such as computer monitors, TV sets, and projectors, have become the most common devices for displaying moving pictures.

In parallel with the development of electronic displays, the capture and storage of images, moving or not, have also evolved from traditional photography, which used film based on chemical reactions, to electronic devices. Nowadays, movies and still images are captured, stored, transmitted and reproduced as digital signals and data structures in all but a handful of cases.

With very few exceptions, electronic displays generate pictures that are perceived the same regardless of the position of the viewer. Indeed, a lot of engineering effort has been devoted to achieving displays that have a wide viewing angle and exhibit minimal degradation of the picture even for viewers looking at the display from directions that are very different from optimal. There are, however, situations where it is desirable to have a display that shows different pictures when viewed from different angles. Such displays are known as multi-view displays.

Conventional (non-multi-view) electronic displays generate visible images by means of an array of pixels. The term "pixel" is widely used in conjunction with images and image processing. It is a contraction of "picture element" and it refers to the smallest image-forming unit of a display. Generally electronic displays have a large number of pixels; for example, a typical television set of the so-called High-Definition (HD) variety has about two million pixels. High-end television sets such as so-called 4K sets can have more than eight million pixels.

Each pixel of an electronic display emits light of a particular color and brightness, such that the collection of all the pixels forms a pattern that is perceived as an image by the human eye. Typically, the light emitted by a single pixel can be completely specified by providing three numbers, one for each of the three primary colors, red, green, and blue. In typical displays, eight bits are used for specifying each of the three numbers, such that a total of twenty-four bits per pixel are needed in order to fully specify an image to be displayed by an electronic display. High-end display might need more than twenty-four bits per pixel.

At twenty-four bits per pixel, an HD display needs almost fifty million bits to specify a complete image. Moving pictures are realized as a sequence of static images (aka frames) that follow one another at a high rate (the frame rate). A typical frame rate is 60 frames per second, which, at fifty million bits per frame, yields a bit rate of three billion bits per second. This is the bit rate needed to convey a full moving picture to a high-definition television set. More advanced displays such as 4K television sets need proportionally higher bit rates.

Even with modern electronics and telecommunication capabilities, these are high bit rates to handle. Fortunately, many decades of research by a large number of researchers have yielded compression techniques that make it possible to encode full-motion video streams into much reduced bit rates. Compression ratios approaching 1000:1 or even higher have been achieved, and they can support surprisingly good picture quality. It is the use of such compression ratios that has enabled the ubiquity of visual content in modern society.

FIG. 1 is a block diagram that shows an example of how a conventional (non-multi-view) electronic display might be used. The diagram comprises a source of visual content 110. The term "visual content" should be understood to refer to any type of material that can be represented as an image or images, whether moving or static, suitable for visual consumption by a human viewer. In the example of FIG. 1, the source of visual content is a movie database that stores a plurality of movies. One of the movies is being retrieved from the database and conveyed to electronic display 130.

In the example of FIG. 1, the electronic display 130 might be a movie projector in a movie theatre. The visual content representing the movie is conveyed to the site of the projector as visual content stream 115. The medium that supports the visual content stream is not explicitly identified in the figure, but those skilled in the art will know that a variety of possibilities exist. For example, the medium might be a so-called Ethernet cable.

As noted above, the availability of compression techniques makes it possible for the visual content to be carried by a bit rate that is much less than the bit rate needed to fully specify the images to be displayed by the electronic display 130. However, the compressed visual content stream needs to be converted into such fully-specified images for the electronic display to be able to properly activate all its pixels such that each pixel emits light of the desired color and brightness. In particular, if each pixel requires twenty-four bits for specifying the light to be emitted, the visual content stream needs to be converted into a plurality of 24-bit data elements, one for each pixel, at the frame rate. In FIG. 1, this task is performed by the graphic processing unit (GPU) 120, which is connected to the electronic display via connection 125. As noted above, if the electronic display is of the HD variety, about 3 billion bits per second need to be transferred over connection 125. In a movie theater, the projector is likely to be better than a plain HD projector, in which case the bit rate carried by connection 125 is expected to be higher.

FIG. 2 illustrates the principle of operation of a typical image projector. The illustration applies to old-fashioned movie projectors and slide projectors that project images from film, and it also applies to modern electronic projectors. In all such cases, the image to be projected onto a screen originates as a bright image that emits light, shown in the figure as bright image 210. In the case where film is used for the image, the light comes from a bright light bulb behind the film, and the film acts as a filter that selectively allows the passage of light of different colors and brightness in different portions of the image. A similar technique is used in some modern projectors wherein the filter might be a liquid-Crystal Display (LCD) module or some other type of electronic light filter, instead of film. Alternatively, the bright image might be generated by an array of bright sources such as, for example, light-emitting diodes (LED), or by digital micromirror devices that reflect light from a separate source.

In a modern electronic projector, the bright image is generated as a collection of pixels, wherein each pixel emits light of a particular color and brightness in a wide range of directions. In a projector, as depicted in FIG. 2, some of the light emitted by each pixel is collected by a lens 220. In the figure, two pixels are highlighted explicitly as pixel 230-1 and 230-2. The figure shows, for example, the light 240-1 emitted by pixel 230-1 and collected by the lens 220. The lens is adjusted such that the light collected from the pixel is focused into a light beam 250-1 focused on a projection screen some distance away (the screen is not shown explicitly in the figure). When the light beam 250-1 reaches the screen, it produces a bright spot on the screen. The color and brightness of the spot are the same as the color and brightness of pixel 230-1 in the bright image 210. The light 240-2 from pixel 230-2 is also processed by the lens 220 in similar fashion, such that it also produces a bright spot on the screen whose color and brightness are the same as the color and brightness of pixel 230-2. All the pixels of the bright image 210 produce bright spots on the screen in similar fashion. The collection of all the bright spots on the screen forms the projected image.

FIG. 3 is a block diagram that shows an example of a system for distributing data to a plurality of electronic displays. In the example, the electronic displays are projectors. This might be applicable, for example, to a multiplex movie theater with a plurality of viewing rooms. The diagram comprises a source of visual content 310 which, in the example, is a movie database that stores a plurality of movies.

The source of visual content generates a plurality of visual content streams, some of which are depicted in the block diagram as visual content streams 315-1, 315-2, and 315-3. They might be, for example, different movies to be shown in different rooms of the multiplex movie theater; although it's also possible that some rooms might be showing the same movie, in which case two or more of the visual content streams would carry the same movie, possibly with different starting times.

As in FIG. 1, each visual content stream is received by a GPU. Three GPUs are depicted in the figure as 320-1, 320-2, and 320-3. Each GPU converts the corresponding visual content stream into fully-specified images for the associated electronic display. The three GPUs shown in the figure are associated with and connected to three electronic displays 330-1, 330-2, and 330-3 through connections 325-1, 325-2, and 325-3, respectively.

The system of FIG. 3 is practically realizable in the prior art because, in the example of a multiplex movie theater, the number of electronic displays (projectors) is not too large. Few movie theaters have more than 10-20 viewing rooms. Other situations exist wherein a larger number of electronic displays need to receive independent visual content streams. For example, in a modern airplane, it often happens that each passenger has an individual display for viewing movies or other visual content in a personalized fashion. In such a situation, the block diagram of FIG. 3 might be applicable, with the number of electronic displays being as large as possibly a few hundred. Even with such larger numbers of displays, such systems are practically realizable, especially because, in an airplane, each electronic display is likely to have much less resolution than a projector in a movie theater.

In FIG. 3, the visual content streams are depicted as being distributed as individual links emanating from the source of visual content. Such a structure is known as a "star topology". Those skilled in the art will know that other topologies are also possible for a system that distributes data to a plurality of destinations; for example, such a data distribution system might be realized as a data bus. Other topologies are also possible and well known in the art.

As hinted above, block diagrams such as in FIG. 3 are practically realizable because of the moderate volume of data to be distributed to the GPUs. Data distribution systems are available that provide the necessary capacity. However, if the number of electronic displays becomes very large (for example, hundreds of thousands or millions) the volume of data to be distributed becomes so large as to exceed the capabilities of available data distribution systems. This is likely to be especially true if the electronic displays have a large number of pixels.

SUMMARY

A conventional electronic display comprises an array of pixels, each of which emits light in a wide range of directions. This makes it possible for multiple viewers to simultaneously view the display from different angles, with all the viewers seeing the same displayed image. In contrast, a multi-view display is able to show different images to different viewers simultaneously. Based on the position of the viewer relative to the multi-view display, each viewer sees a different image while looking at the display surface of the multi-view display and does not see the images seen by other viewers.

A multi-view display has this capability because, instead of conventional pixels, a multi-view display comprises "multi-view" pixels. A multi-view pixel can control not just the brightness, but also the spatial distribution of emitted light. In particular, a multi-view pixel can be commanded, for example and without limitation, to emit light in certain directions but not others; or it can be commanded to independently adjust the brightness and/or color of light emitted in different directions.

The word "beamlet" is defined in this disclosure for the purpose of more easily presenting embodiments of the present invention. As defined below in greater detail, a beamlet is an element of emitted light that can be individually controlled. In particular, a beamlet is the light emitted by a multi-view pixel in a narrow range of directions wherein overall emitted light can be controlled independently of the light emitted in other directions.

FIGS. 4-6 illustrate the design and functionality of multi-view displays and multi-view pixels. In particular, FIG. 5 illustrates how a multi-view pixel might be designed to emit a plurality of beamlets. The structure of a multi-view pixel, as depicted in FIG. 5, can be observed to be similar to the structure of a projector, as depicted in FIG. 2.

In many applications, multi-view displays are expected to comprise a large number of multi-view pixels; indeed, the quality of images seen by individual viewers of a multi-view display is affected by the number of multi-view pixels in the same way in which the quality of images from conventional displays is affected by the number of conventional pixels. It is anticipated that there will be demand for multi-view displays to be competitive with conventional displays in the number of pixels. Therefore, multi-view displays with as many as several million multi-view pixels should be considered possible.

As shown in FIG. 5, the structure of a multi-view pixel is similar to the structure of a conventional projector. Therefore, the task of distributing visual content to the multi-view pixels of a multi-view display can be regarded as similar to the task of distributing visual content to a plurality of projectors. FIG. 3 is a block diagram of a system that performs such a task; except that, as noted in the previous paragraph, the number of multi-view pixels might be as large as several million.

The beamlets of a multi-view pixel have a counterpart in a projector in the form of the projector's (conventional) pixels. In particular, a projector projects an image on a screen by emitting a plurality of narrow light beams, one for each (conventional) pixel to be generated on the screen. The narrow light beams agree with the definition of beamlet provided in this specification.

In a multi-view display, the number of beamlets emitted by each multi-view pixel affects the flexibility of the multi-view display in being able to precisely adjust the zones where different images are supposed to be visible. Therefore, it is expected that, in many applications, there will be demand for multi-view pixels that emit a large number of beamlets in order to offer high flexibility. It is anticipated that the number of beamlets might be as large as the number of (conventional) pixels that current projectors are capable of generating. Data distribution systems such as the system of FIG. 3, for distributing visual content streams to a plurality of projectors, are unlikely to be practically feasible for distributing data to be displayed by a large number of multi-view pixels, each with a large number of beamlets, in a large multi-view display. Other data distribution techniques that are well known in the art are also expected to be inadequate.

Embodiments of the present invention exploit certain redundancies in the visual content to be displayed by a multi-view display for the purpose of greatly reducing the complexity of distributing data to the plurality of multi-view pixels. In such embodiments, each multi-view pixel receives data from a processing unit that performs a function similar to the function of the GPUs of FIG. 3. However, in such embodiments, the processing units also perform additional tasks that, ordinarily, would be performed in the source of visual content. The additional tasks not only reduce the computational load of the source of visual content, but, most important, they make it possible to vastly reduce the volume of data to be distributed by the data distribution system.

Such reduction in the volume of data is possible because of the expected pattern of use of multi-view displays. It is expected that two simplifying assumptions will be valid in most applications of multi-view displays.

The first assumption has to do with the number of different images to be displayed. Multi-view displays are useful for displaying multiple images simultaneously for viewers located in different places; however, it is expected that, in many, if not most applications, the number of images is likely to be small.

For example, a multi view display might be used in a sports arena for showing different information to different areas of the arena based on which team is favored by participants seated in different zones. Such a multi view display might need flexibility for shaping the zones differently for different sports events. For example, when both competing teams are local, the two zones might be of approximately equal size, while, in other situations, one zone might need to be larger than the other.

In the example of the previous paragraph, it is desirable for the multi view pixels of the multi view display to have a large number of beamlets, so as to provide the desired flexibility in sizing and shaping the viewing zones; however, there are always only two viewing zones and two images to be made visible, at any given time, to occupants of the arena.

The second assumption has to do with how viewing zones are specified. It is expected that, in many applications, the specifications of viewing zones will not be excessively complex. For example, in the sports arena of the previous paragraphs, the owner of the sports arena might decide, in advance of an event, which seats are to be assigned to fans of different teams. The owner could then program the multi-view display to implement viewing zones that match the seat assignments. By necessity, the task of programming the multi-view display cannot be made overly complex for the arena owner. Therefore, it is expected that the specifications of viewing zone boundaries provided, in this example, by the arena owner, will not be excessively detailed.

In many applications, it is expected that viewing zones will be specified as a collection of two-dimensional polygons. In other applications, viewing zones might be specified in three-dimensional space, in which case it is expected that they will be specified as a collection of polyhedra. In most cases, it is expected that the number of polygons or polyhedra involved will not be excessively large.

When the two assumptions are valid, embodiments of the present inventions are possible wherein the source of visual content does not have to distribute a large number of visual content streams, one for each multi-view pixel. In such embodiments, a second source of digital data is present, along with the source of visual content. The second source generates viewing-zone specifications that are distributed to the processing units in parallel with the visual content streams.

In these embodiments, there is only one visual content stream for each distinct viewing zone, and the stream simply conveys data relative to the visual content to be made visible in the associated zone. Because of the first assumption, the number of visual content streams needed is expected to be small.

In these embodiments, each processing unit typically receives all the visual content streams. The processing unit has the task of computing which beamlets of the associated multi-view pixel land in which viewing zone. The computation is based on the viewing-zone specifications. Because of the second assumption, it is expected that the computational task for the processing unit will be manageable.

In situations wherein the two assumptions are valid, embodiments of the present invention achieve a substantial reduction in complexity, compared to using a distribution system based on the prior-art data distribution technique of FIG. 3.

BRIEF DESCRIPTION OF THE DRAWINGS

FIG. 8 is a block diagram of a system for distributing data to a plurality of multi-view pixels of a multi-view display in accordance with an alternative illustrative embodiment of the present invention.

DETAILED DESCRIPTION

Figure 4:
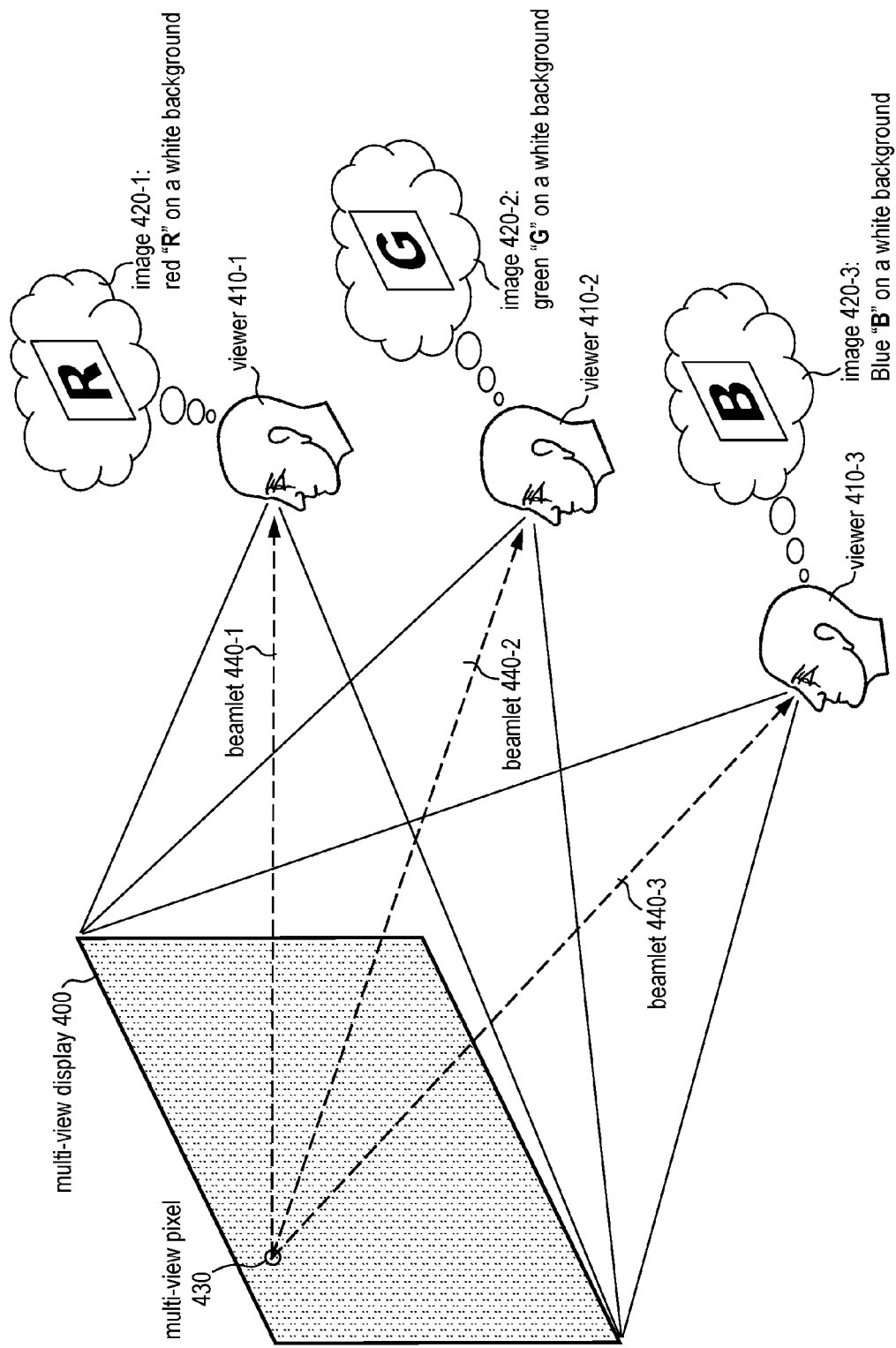
FIG. 4 illustrates the functionality of a multi-view display.

FIG. 4 illustrates the functionality of a multi-view display. In the figure, multi-view display 400 is viewed simultaneously by three viewers 410-1, 410-2, and 410-3. The three viewers are positioned at three distinct positions from which the multi-view display is visible. Each of the three viewers sees a different image on the display surface of the multi-view display. The three different images seen by the three viewers are depicted in the figure as images 420-1, 420-2, and 420-3. In particular, viewer 410-1 sees a red letter "R" on a white background, viewer 410-2 sees a green letter "G" on a white background, and viewer 410-3 sees a blue letter "B" on a white background.

For each of the three viewers, the experience of viewing the display is similar to viewing a conventional display, such as a standard television set, but each viewer sees a different image on the display surface of the multi-view display. Each viewer is, possibly, not even aware that other viewers are seeing different images. Hereinafter, the term "viewing space" will be used to refer to the range of possible positions for viewers to experience the multi-view display functionality.

The functionality of multi-view display 400 is based on the functionality of the individual multi-view pixels of the multi-view display. One such multi-view pixel is depicted in FIG. 4 as multi-view pixel 430. The functionality of the multi-view pixel is best understood by comparison with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In a scenario like the one depicted in FIG. 4, if the display were a conventional display, the light emitted by each conventional pixel would reach the eyes of the three viewers with the same color and, approximately, the same brightness. All three viewers would see the same image on the display surface, as a collection of glowing conventional pixels.

In contrast to a conventional pixel, multi-view pixel 430 is able to emit different light in different directions. In each direction, light of a particular type is emitted as a narrow beam. As already mentioned, such a narrow beam is referred to as a "beamlet". FIG. 4 depicts three beamlets 440-1, 440-2, and 440-3, wherein beamlet 440-1 is aimed at the eyes of viewer 410-1, beamlet 440-2 is aimed at the eyes of viewer 410-2, and beamlet 440-3 is aimed at the eyes of viewer 410-3.

In the illustrative example of FIG. 4, to avoid clutter, the beamlets are depicted as simple dashed lines with an arrowhead indicating the direction of propagation of beamlet light; however, beamlets can have any size and shape.

In the illustrative example of FIG. 4, the three beamlets 440-1, 440-2, and 440-3 each carry light corresponding to the brightness of the image that each viewer is supposed to see. For example, as noted above, viewer 410-2 sees a green letter "G" on a white background, while viewer 410-3 sees a blue letter "B" on a white background. Correspondingly, there are areas of the display surface where viewer 410-2 is supposed to see the color white while viewer 410-3 is supposed to see the color blue. If multi-view pixel 430 lies in one such area, beamlet 440-2 will carry white light, while beamlet 440-3 will carry blue light. As in conventional displays, viewers perceive images as a collection of pixels of various colors and brightness. With a multi-view display, the ability of multi-view pixels to emit different beamlets in different directions makes it possible for different viewers to perceive the same multi-view pixel as having different colors and different brightness, such that each viewer sees the collection of multi-view pixels as a different image.

Figure 5:
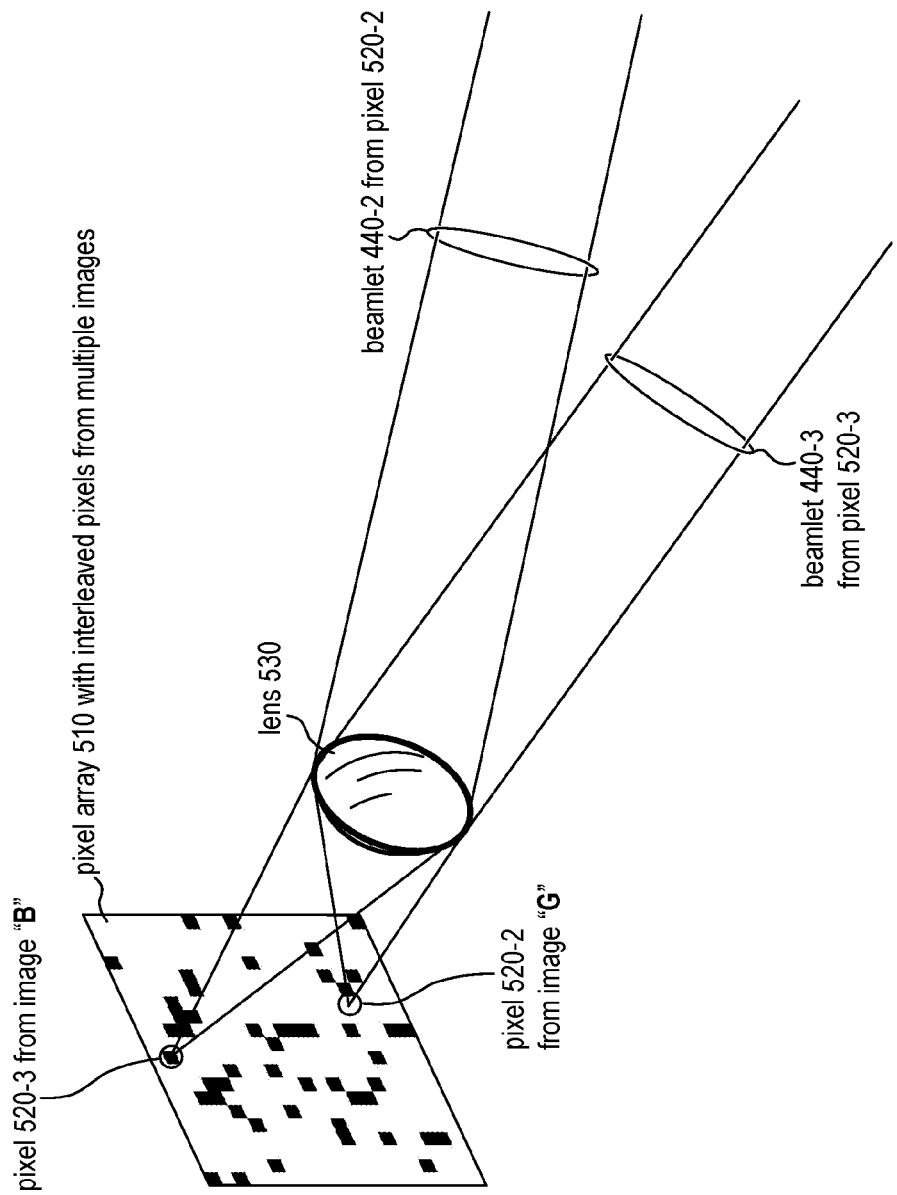
FIG. 5 depicts an illustrative implementation of a multi-view pixel.

FIG. 5 depicts a possible illustrative implementation of multi-view pixel 430. The multi-view pixel comprises a pixel array 510, which is a rectangle with 400 conventional pixels arranged in a 20×20 array. It enables the multi-view pixel to emit as many as 400 different beamlets. Each beamlet originates as a pixel in pixel array 510.

Lens 530 implements the conversion of a pixel in pixel array 510 into a beamlet. In particular, pixel 520-2 is the pixel that is converted into beamlet 440-2. As already noted, beamlet 440-2 is supposed to carry white light. Accordingly, pixel 520-2 is a conventional pixel that comprises a material able to glow emitting white light when electrically excited with an appropriate electrical excitation. In the illustrative implementation of FIG. 5, pixel 520-2 is electrically excited and emits white light in all directions. Lens 530 collects a sizable fraction of the emitted white light and collimates it into beamlet 440-2. Similarly, pixel 520-3 is the pixel that is converted into beamlet 440-3, and it is supposed to carry blue light. Correspondingly, pixel 520-3 is a conventional pixel that comprises a material able to glow emitting blue light. In the illustrative implementation of FIG. 5, pixel 520-3 is emitting blue light in all directions. Lens 530 collects a sizable fraction of the emitted blue light and collimates it into beamlet 440-3.

Figure 1:
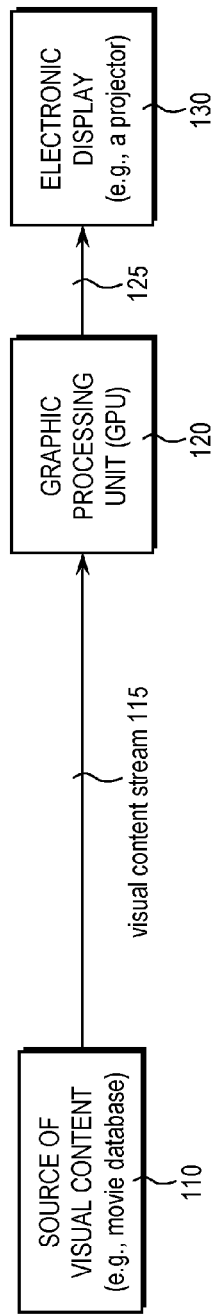
FIG. 1 is a block diagram that shows an example of how a conventional electronic display might be used.
Figure 2:
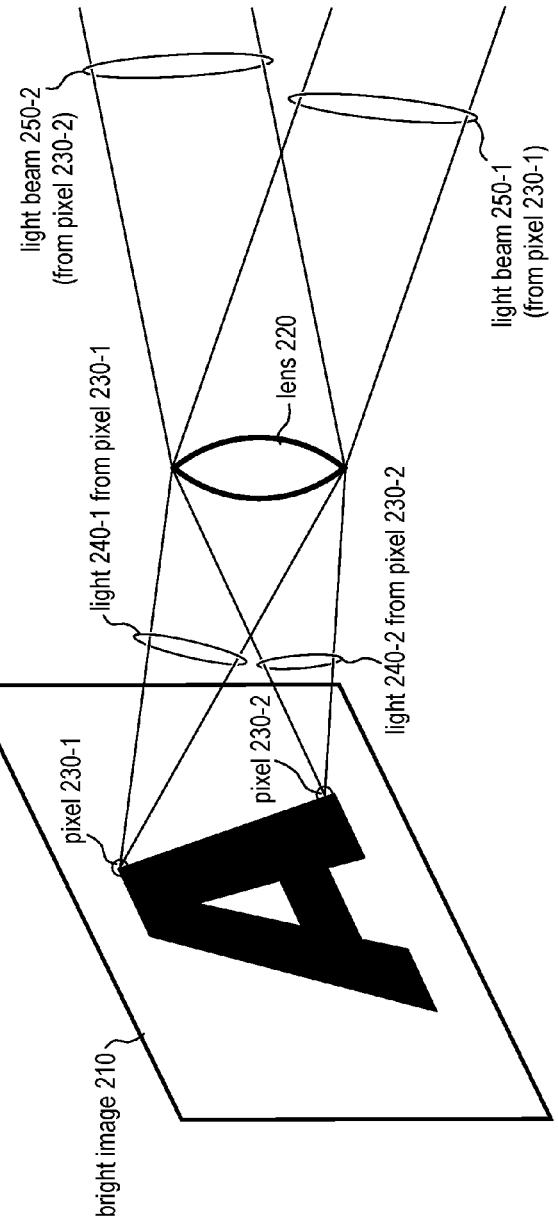
FIG. 2 illustrates the principle of operation of a typical image projector.
Figure 3:
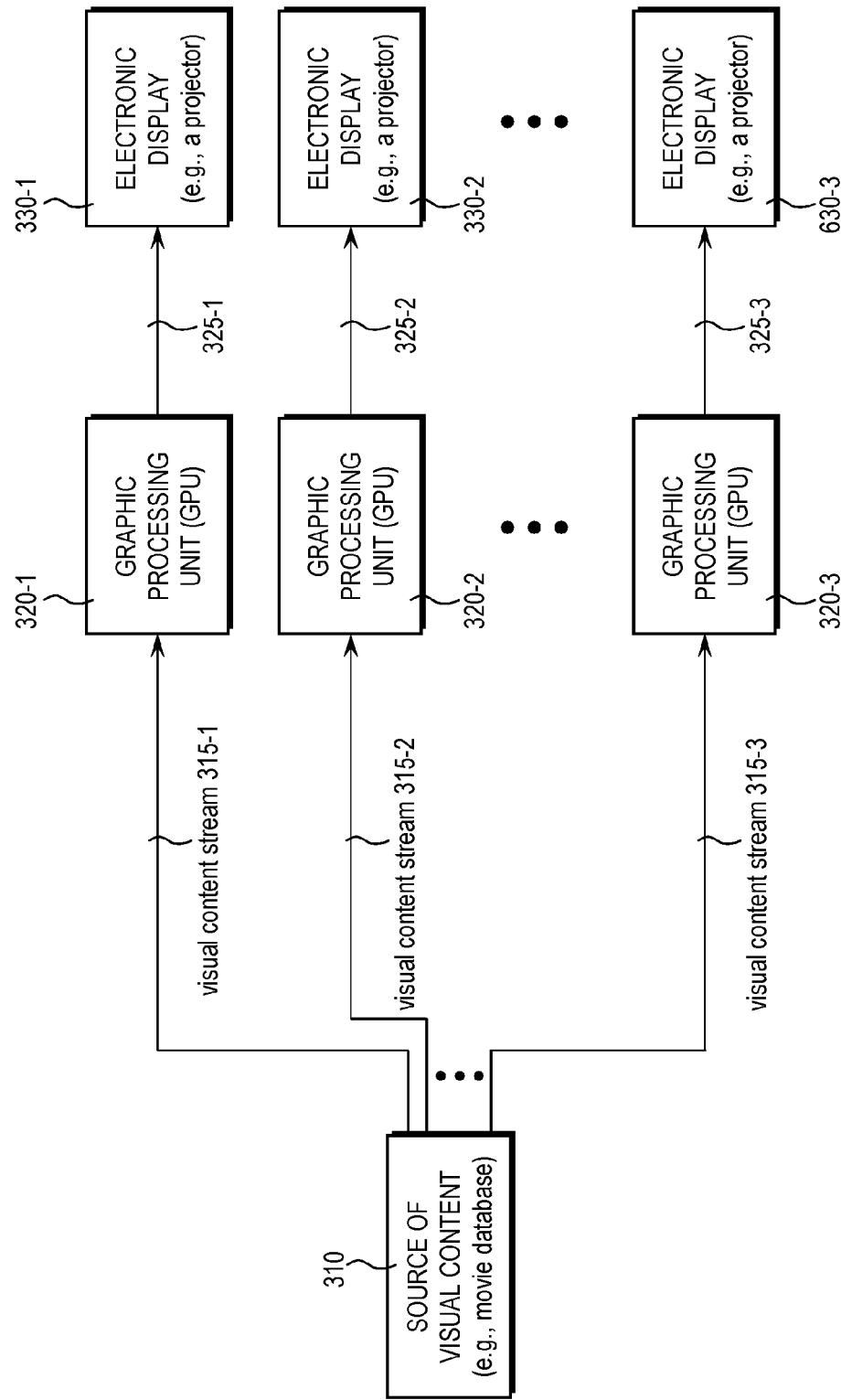
FIG. 3 is a block diagram that shows an example of a system for operating a plurality of electronic displays.

The depiction of multi-view pixel 430 presented in FIG. 5 is similar to the illustration of the principle of image projection presented in FIG. 2. Indeed, the functionality of a multi-view pixel is similar to the functionality of an image projector, as already noted, and the task of providing image data to a multi-view pixel for generating a desired pattern of beamlets is similar to the task of providing image data to a projector. In both cases the data must specify brightness and color for each pixel in bright image 210, for the projector, and for each pixel in pixel array 510, for the multi-view pixel.

Figure 6:
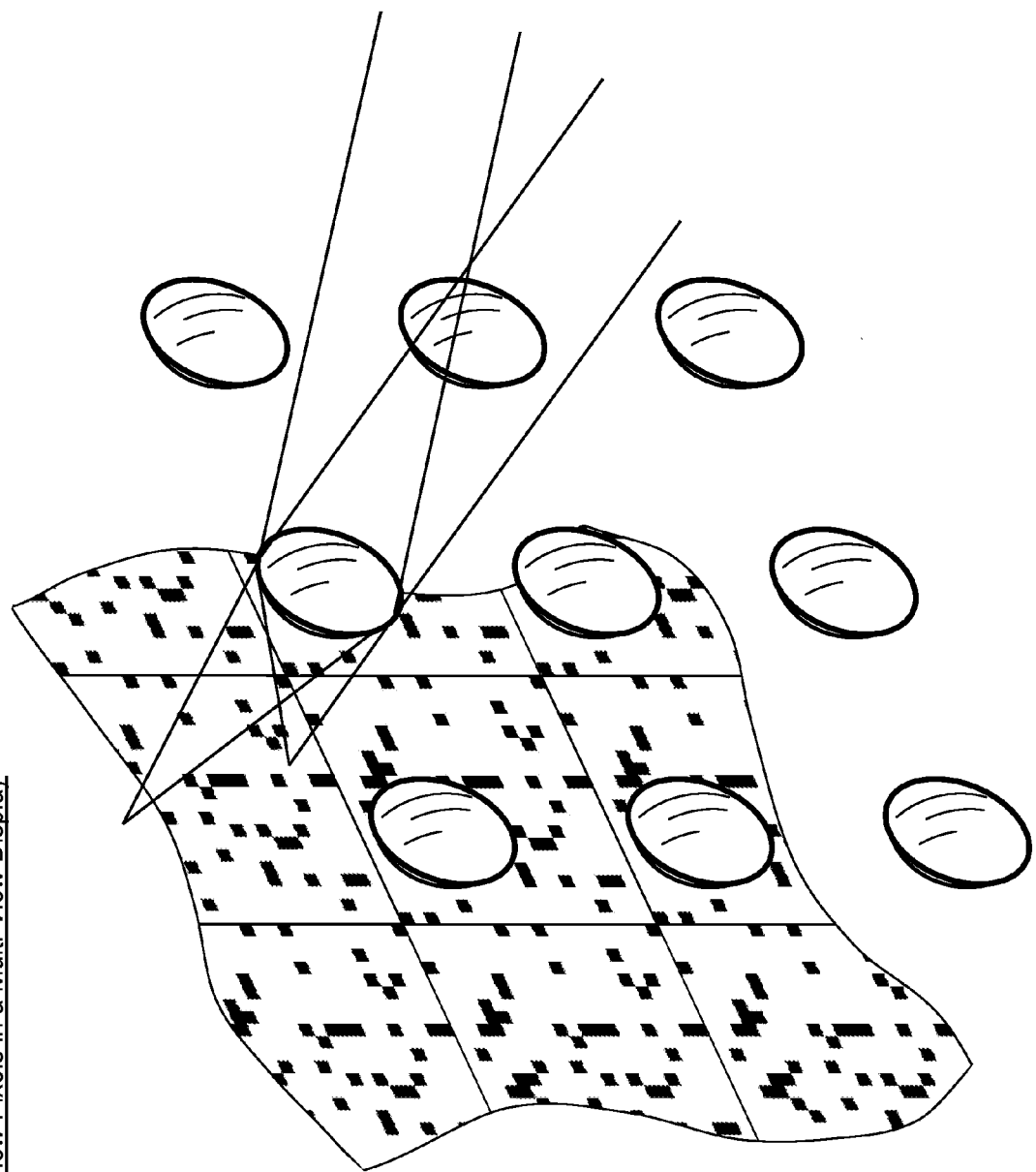
FIG. 6 illustrates how multiple multi-view pixels can be assembled together as an array to form a multi-view display.

FIG. 6 illustrates how multiple multi-view pixels might be assembled together as an array of multi-view pixels to form a multi-view display. In a conventional display, a regular (usually rectangular) array of adjacent pixels is typically used to form images. In a multi-view display in accordance with the illustrative example of FIG. 6, the multi-view pixels are also arranged in a rectangular array, a portion of which is shown in the figure. Each multi-view pixel has its own 20×20 pixel array 510, and the 20×20 pixel arrays of adjacent multi-view pixels are juxtaposed in a rectangular pattern to form a larger pixel array. The lenses 530 from the multiple multi-view pixels are also arranged in a rectangular pattern such that each lens is in the proper position in front of the corresponding 20×20 pixel array 510.

Figure 7:
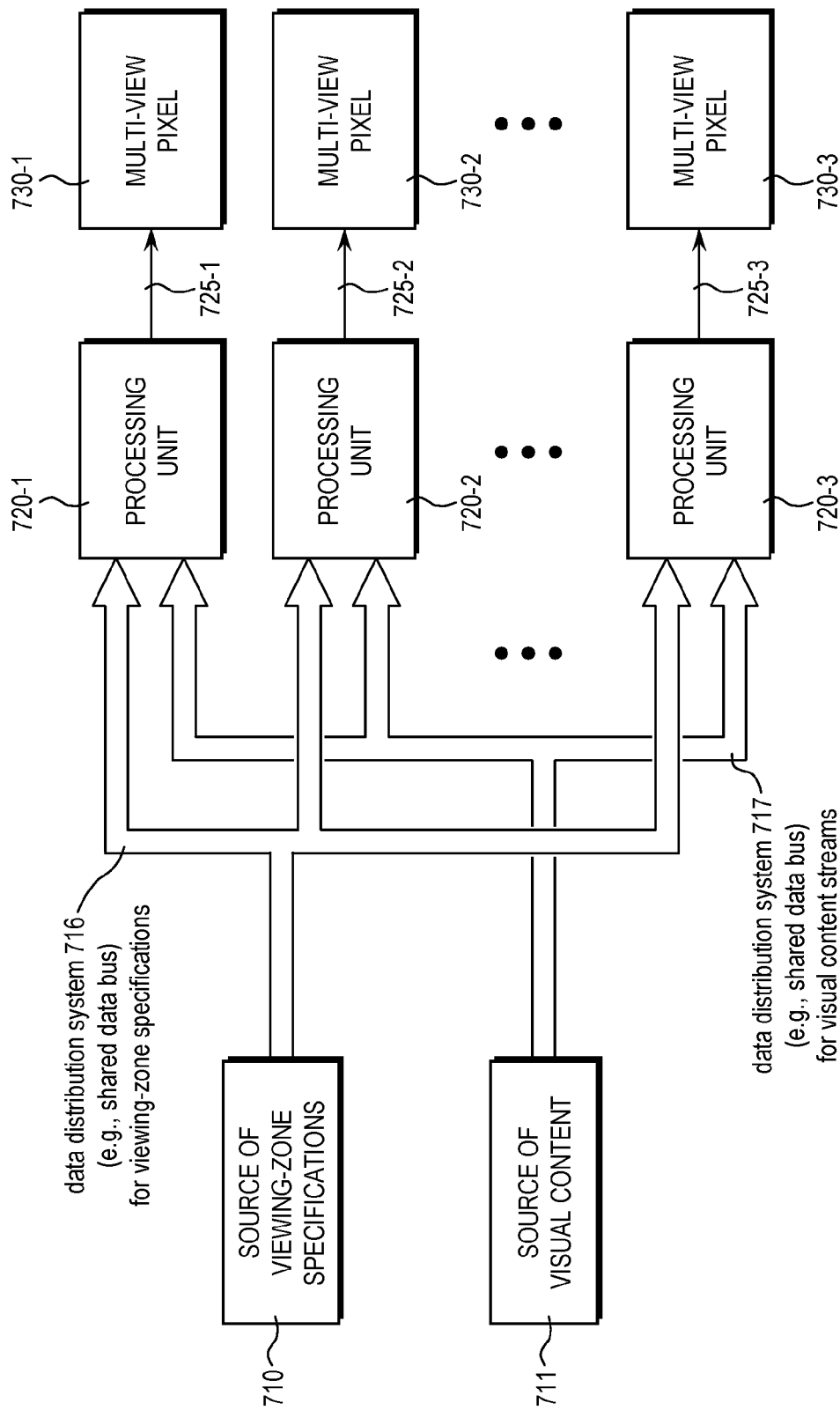
FIG. 7 is a block diagram of a system for distributing data to a plurality of multi-view pixels of a multi-view display in accordance with an illustrative embodiment of the present invention.

FIG. 7 is a block diagram of a system 700 for distributing data to a plurality of multi-view pixels of a multi-view display in accordance with an illustrative embodiment of the present invention. The system comprises a source of visual content 711 that generates a plurality of visual content streams. One stream is generated for each distinct viewing zone that the multi-view display is supposed to implement; the stream contains all the image data for generating the visual content to be made visible in that viewing zone. For example and without limitation, the visual content stream might be an MPEG-encoded movie, or a sequence of JPEG-encoded images, or any other type of data that specifies a visible image sequence to be displayed (i.e., made visible) by the multi-view display in a specified viewing zone.

The visual content streams are distributed to a plurality of processing units, some of which are depicted in the block diagram as processing units 720-1, 720-2 and 720-3 via a data distribution system 717 which, in this illustrative embodiment, is implemented as a shared data bus.

The system also comprises a source of viewing-zone specifications 710 that generates specifications for all the viewing zones that the multi-view display is supposed to implement. The specifications comprise all the necessary information to define the boundaries of the viewing zones, whether in two dimensions, or in three dimensions, or in some other suitable geometric representation that is effective for the multi-view display and its mode of use. The specifications also indicate which visual content stream is to be made visible in which viewing zone.

The viewing-zone specifications are distributed to the plurality of processing units 720-1 through 720-3 via a data distribution system 716 which, in this illustrative embodiment, is implemented as a shared data bus.

Each processing unit 720-1 through 720-3 is connected to a multi-view pixel 730-1 through 730-3 via a connection 725-1 through 725-3. The block diagram shows explicitly only three processing units 720-1 through 720-3, and three multi-view pixels 730-1 through 730-3 connected to the processing units, but the system comprises a larger number of processing units and multi-view pixels.

Each processing unit receives all the visual content streams, and all the viewing-zone specifications. Furthermore, each processing unit knows the capabilities of the multi-view pixel to which it is connected. For example and without limitation, in this illustrative embodiment, the processing unit comprises non-volatile memory which stores geometric parameters of the beamlets of the multi-view pixel. Such geometric parameters might comprise, for example, the direction of propagation of each beamlet, and the position in space of the multi-view pixel, from which the beamlet is emitted. Through geometrical calculations well known in the art, such geometrical parameters make it possible to know where the beamlet propagates in space and where it lands.

Each processing unit processes the viewing-zone specifications, in conjunction with the geometric parameters of the beamlets, to derive, for each beamlet, the identity of the viewing zone where the light from the beamlet lands. That identity indicates which visual content stream should be used to determine the color and brightness of the light of that beamlet. Then, the processing unit can extract, from the visual content stream, in well-known fashion, the pixel color and brightness associated with the position of the multi-view pixel in the multi-view display. That color and brightness are the color and brightness to be assigned to the beamlet.

After determining, for each beamlet, the appropriate color and brightness, the processing units 720-1 through 720-3 convey such displayable data to the multi-view pixels 730-1 through 730-3 via the connections 725-1 through 725-3, respectively, and the multi-view pixels display the data by commanding each beamlet to have the color and brightness specified by the displayable data.

In FIG. 7, the block diagram does not explicitly show how the the processing units learn the geometric parameters of the beamlets. The next figure shows it explicitly.

FIG. 8 is a block diagram of a system 800 for distributing data to a plurality of multi-view pixels of a multi-view display in accordance with an alternative illustrative embodiment of the present invention. In this system, a calibration procedure has been performed for characterizing the capabilities of the multi-view pixels. Such a calibration procedure is useful for making it possible to compensate for departures of actual multi-view pixels from nominal performance. In particular, when assembling a plurality of multi-view pixels into a multi-view display, it is difficult to align the multi-view pixels with sufficient accuracy to be able to exactly predict the geometric parameters of the beamlets relative to other multi-view pixels and to the multi-view display as a whole. Calibration techniques that can solve this problem are described in U.S. patent application Ser. No. 15/002,014. Such calibration techniques can yield a table of calibration parameters that characterize the capabilities of the multi-view pixels, including geometric parameters of beamlets.

In the system 800 of FIG. 8, the values of such calibration parameters are provided by source of calibration parameters 812, and they are distributed to the plurality of processing units via a data distribution system 818 which, in this illustrative embodiment, is implemented as a shared data bus. Otherwise, the block diagram of FIG. 8 is equivalent to the block diagram of FIG. 7.

Although FIGS. 7 and 8 show separate data distribution systems for the visual content streams, the viewing zones specifications, and the calibration parameters, it will be clear to those skilled in the art, after reading this disclosure, how to make and use embodiments of the present invention wherein two or more of the data distribution systems are the same data distribution system. Also, although the figures show the data distribution systems to be shared buses, it will be clear to those skilled in the art, after reading this disclosure, how to make and use embodiments of the present invention wherein data distribution systems with other structures or topologies are used. For example and without limitation, in some embodiments it is advantageous to have a single shared bus for distributing all data of all types. In other embodiments, wherein visual content streams have different requirements of latency, throughput and bit rates, compared to viewing-zone specifications and calibration parameters, it is advantageous to use different data distribution systems with different hardware and software characteristics. For example and without limitation, visual content streams can be distributed using a plurality of HDMI cables in a start topology, while the other data can be distributed using a shared bus.

Although FIGS. 7 and 8 show each data distribution system as being implemented as a single system, it will be clear to those skilled in the art, after reading this disclosure, how to make and use embodiments of the present invention wherein one or more of the data distribution systems are realized as a combination of systems. For example, and without limitation, a data distribution system might be realized as a single bus or network, or as a collection of multiple buses or networks, or as a combination of buses and networks operating together in parallel or in series or in other combinations. Also, buses and networks are just examples of structures that can be used; other structures exist that are well known in the art, such as, for example and without limitation, rings, daisy chains, and other structures. All these and other structures can be used alone or in combination with one another and/or with one or more instantiations of one or more types of structures.

Although the data distribution systems and other connections are presented in this disclosure as being wired data distribution systems and connections, it will be clear to those skilled in the art, after reading this disclosure, how to make and use embodiments of the present invention wherein other types of data distribution systems and connections are used. For example and without limitation, the data distribution systems and connections can be wired or wireless based on radio waves or on optical signals or on other types of wired or wireless signals.

Although the processing units in FIGS. 7 and 8 are depicted as each being connected to a single multi-view pixel, it will be clear to those skilled in the art, after reading this disclosure, how to make and use embodiments of the present invention wherein a processing unit is connected to and provides displayable data to more than one multi-view pixel. Also, a processing unit can have one or more processors or cores, as needed to provide the necessary processing capabilities.

Although in the illustrative embodiment of FIG. 7 the example is made of the visual content streams being encoded in accordance with the MPEG standard, which is a compressed standard, it will be clear to those skilled in the art, after reading this disclosure, how to make and use embodiments of the present invention wherein other standards or other formats are used, whether compressed or not. For example, and without limitation, the extent of compression, if any, to be used for the visual content streams can be adjusted to optimize the complexity of the processing units relative to the cost and complexity of the data distribution system 717. A more aggressive compression can lead to a smaller volume of data to be distributed by the data distribution system, but the processing units are likely to require more processing power for de-compressing the compressed visual content streams. In every application, there is likely to be an optimal compromise between extent of compression and the processing power required by the processing unit. In some embodiments, it will be advantageous to have no compression at all.

Although in the illustrative embodiment of FIG. 7 the example is made of non-volatile memory being used for storing geometric parameters of the beamlets of the multi-view pixel and/or other calibration parameters, it will be clear to those skilled in the art, after reading this disclosure, how to make and use embodiments of the present invention wherein other types of storage are used. For example and without limitation, in some embodiments of the present invention it is advantageous for the processing unit to use only volatile memory, such that all stored information is lost when the system is powered down. In such embodiments, calibration parameters and, possibly, other parameters are stored in non-volatile memory in the source of calibration parameters 812 and are downloaded to the processing units via the data distribution system 818 at power-up or at any other time that such downloading might be required. Other combinations are also possible, as will be clear to those skilled in the art.

Although FIG. 6 depicts an array of multi-view pixels wherein the multi-view pixels are arranged in a rectangular pattern, it will be clear to those skilled in the art, after reading this disclosure, how to make and use embodiments of the present invention wherein the multi-view pixels are arranged in other patterns. For example and without limitation, multi-view pixels can be arranged on a plane in a pattern that has circular symmetry, or multigonal symmetry, or some other symmetry or symmetries, or no symmetry at all; also, multi-view pixels can be arranged in non-planar patterns, or three dimensional patterns, with or without symmetries. For example and without limitation, multi-view pixels can be mounted on a building or other structure that has a three-dimensional shape, and they can follow the three-dimensional shape of the structure, or they can be mounted with supports or other mounting hardware as necessary to achieve any desired pattern, whether two-dimensional, three-dimensional or otherwise, whether following the shape of the structure or not.

FIG. 6 depicts an array of multi-view pixels wherein all the multi-view pixels are identical, and the 20×20 pixel arrays 510 of adjacent multi-view pixels are juxtaposed. However, it will be clear to those skilled in the art, after reading this disclosure, how to make and use embodiments of the present invention wherein the multi-view pixels of a multi-view display are not all identical and/or not juxtaposed. For example and without limitation, distinct multi-view pixels can have pixel arrays 510 that are of different sizes and/or shapes and/or comprise different numbers of pixels, and the pixels themselves in pixel array 510 don't have to all be of the same size and/or shape; they can be of different sizes and/or shapes and be arranged in patterns other than rectangular, and the pixel patterns in pixel array 510 can be two-dimensional or three-dimensional or otherwise. Also, adjacent multi-view pixels can have juxtaposed pixel arrays 510, or not.

It will be clear to those skilled in the art, after reading this disclosure, how to make and use embodiments of the present invention wherein distribution of viewing-zone specifications and/or calibration parameters occur in real time, while the multi-view display is operating for showing different images to different viewers in different zones, or alternative embodiments where such data distributions occur in non-real time. For example and without limitation, they might occur before commencing normal operation of the multi-view display. In some embodiments of the present invention, it is possible to define and redefine viewing-zone specifications and even, possibly, calibration parameters, dynamically, while the multi-view display is operating.

It will be clear to those skilled in the art, after reading this disclosure, how to make and use embodiments of the present invention wherein calibration parameters comprise a variety of parameters for calibrating a variety of characteristics that are amenable to calibration. For example and without limitation, calibration parameters can comprise (A) color calibration parameters, (B) geometric calibration parameters, (C) multi-view pixel identification parameters, and/or (D) brightness calibration parameters, to name just a few.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

DEFINITIONS

Beamlet—For the purposes of this disclosure, a "beamlet" is defined as an elemental entity of light emitted by a multi-view pixel in a multi-view display. The word does not appear in standard dictionaries. It has been created herein for the purposes of this disclosure and related discussions.

In some implementations of multi-view pixels, a multi-view pixel resembles a conventional image projector. A conventional image projector projects a plurality of narrow light beams toward a projection screen. Each light beam resembles the beam of light emitted by a searchlight or by a lighthouse. With a conventional projector, there is one such beam for each projected pixel. Because of the large number and typically small size of such beams the word "beamlet" has been created to refer to one of them A multi-view pixel is similar to an image projector in that it emits a number of beamlets, but the beamlets are not intended for forming an image on a screen. Rather, they are intended to fall upon the eyes of a viewer. Generally, the intended viewer is human, but optical devices such as cameras can also be used with a multi-view display, and it is possible to envision applications of multi-view displays wherein intended viewers might be non-human viewers such as animals, cameras or other image-capturing entities.

Multi-View Display—For the purposes of this disclosure, a "multi-view display" is defined as a display able to show different images to different viewers. Based on the position of the viewer relative to the multi-view display, each viewer sees a different image while looking at the display surface of the multi-view display, and does not see the images seen by other viewers. This is in contrast to conventional displays, which show the same image to all viewers regardless of where the viewers are positioned relative to the display. In a multi-view display an image is formed as a collection of multi-view pixels.

Multi-View Pixel—For the purposes of this disclosure, a "multi-view pixel" is defined as "the smallest image-forming unit of a multi-view display".

A multi-view pixel is a more flexible version of the type of pixel used in conventional (non-multi-view) displays. In a typical conventional display, pixels emit light in response to electrical excitation, and the brightness, and possibly the color, of a pixel depend on the extent and mode of excitation. Each conventional pixel emits light in all directions, such that all viewers perceive the pixels the same way, regardless of viewer position.

A multi-view pixel, instead, can control not just the brightness and color, but also the spatial distribution of emitted light. In particular, a multi-view pixel can be commanded, for example, to emit light in certain directions but not others; or it can be commanded to independently adjust the brightness and/or color of light emitted in different directions. Other parameters of emitted light can also be adjusted independently for different directions of emission.

Pixel—The word "pixel" is well-known in the art in conjunction with images and image processing. It is a contraction of "picture element" and is defined by the American Heritage dictionary, third edition, as "the smallest image-forming unit of a video display".

What is claimed is:

1. An apparatus for generating data displayable by multi-view pixels in a multi-view display, the apparatus comprising:
   a source of viewing-zone specifications that generates a plurality of viewing-zone specifications;
   a source of calibration parameters for the multi-view pixels, wherein the source of calibration parameters generates the calibration parameters;
   at least one data distribution system, wherein the at least one data distribution system receives the plurality of viewing-zone specifications, the calibration parameters, and a plurality of visual content streams; and
   a plurality of processing units connected to the at least one data distribution system;
   wherein:
   (a) each processing unit is also connected to one or more multi-view pixels of the multi-view display;
   (b) each processing unit receives one or more of the calibration parameters, one or more of the viewing-zone specifications, and one or more of the visual content streams, and generates data displayable by the one or more multi-view pixels to which it is connected; and
   (c) wherein the displayable data generated by each processing unit are based on the one or more visual content streams, on the one or more viewing-zone specifications received by the processing unit, and the one or more calibration parameters of the multi-view pixels.

2. The apparatus of claim 1 wherein the at least one data distribution system comprises a viewing-zone specification distribution system that receives the plurality of viewing zones, a calibration-parameter distribution system that receives the calibration parameters, and a visual-content stream distribution system that receives the plurality of visual content streams.

3. The apparatus of claim 2 wherein the calibration parameter distribution system is a non-real-time data distribution system based on storing calibration parameters into a non-volatile memory of each of the processing units.

4. The apparatus of claim 3 wherein storing calibration parameters occurs as part of a calibration process prior to operating the multi-view display.

5. The apparatus of claim 1 wherein the at least one data distribution system comprises a first data distribution system and a second data distribution system, wherein the first data distribution system receives any two of (a) the plurality of viewing zone specifications, (b) the calibration parameters, and (c) the plurality of visual content streams and the second data distribution system receives the one of (a), (b), and (c) not received by the first data distribution system.

6. The apparatus of claim 1 wherein the calibration parameters comprise one or more parameters selected from the group consisting of (A) color calibration parameters, (B) geometric calibration parameters, (C) multi-view pixel identification parameters, and (D) brightness calibration parameters.

7. A multi-view display comprising:
   a plurality of multi-view pixels;
   at least one data distribution system, wherein the at least one data distribution system receives a plurality of visual content streams, a plurality of viewing-zone specifications, and calibration parameters of the multi-view pixels; and
   a plurality of processing units connected to the at least one data distribution system;

wherein:
(a) each processing unit is also connected to one or more multi-view pixels of the multi-view display;
(b) each processing unit receives one or more of the visual content streams, one or more of the viewing-zone specifications, and one or more of the calibration parameters, and generates data displayable by the one or more multi-view pixels to which it is connected;
(c) the displayable data generated by each processing unit are based on the one or more visual content streams, the one or more viewing-zone specifications, and the one or more calibration parameters received by the processing unit.

8. The multi-view display of claim 7 wherein the at least one data distribution system comprises a viewing-zone specification distribution system that receives the plurality of viewing zones, a calibration-parameter distribution system that receives the calibration parameters, and a visual-content stream distribution system that receives the plurality of visual content streams.

9. The apparatus of claim 7 wherein the at least one data distribution system further comprises a first data distribution system and a second data distribution system, wherein the first data distribution system receives any two of (a) the plurality of viewing zone specifications, (b) the calibration parameters, and (c) the plurality of visual content streams and the second data distribution system receives the one of (a), (b), and (c) not received by the first data distribution system.

10. A method for generating data displayable by multi-view pixels in a multi-view display, the method comprising:
receiving, by at least one data distribution system, a plurality of visual content streams, a plurality of viewing-zone specifications, and calibration parameters of the multi-view pixels by which the data is displayable;
distributing, by the at least one data distribution system, the plurality of visual content streams, the plurality of viewing-zone specifications, and the calibration parameters to a plurality of processing units that are connected to the at least one data distribution system;
generating, by each processing unit, data displayable by one or more multi-view pixels, wherein the displayable data are generated based on one or more visual content streams received by the processing unit, on one or more viewing-zone specifications received by the processing unit, and one or more calibration parameters;
wherein each processing unit is connected to the one or more multi-view pixels by which the displayable data generated by the processing unit are displayable.

11. The method of claim 10 wherein the at least one data distribution system comprises a viewing-zone specification distribution system that receives the plurality of viewing zones, a calibration-parameter distribution system that receives the calibration parameters, and a visual-content stream distribution system that receives the plurality of visual content streams.

12. The method of claim 11 wherein the at least one data distribution system further comprises a first data distribution system and a second data distribution system, wherein the first data distribution system receives any two of (a) the plurality of viewing zone specifications, (b) the calibration parameters, and (c) the plurality of visual content streams and the second data distribution system receives the one of (a). (b), and (c) not received by the first data distribution system.

13. The method of claim 10 wherein the calibration parameters comprise one or more parameters selected from the group consisting of (A) color calibration parameters, (B) geometric calibration parameters, (C) multi-view pixel identification parameters, and (D) brightness calibration parameters.

14. The method of claim 11 wherein the calibration parameter distribution system is a non-real-time data distribution system, and
wherein the method further comprises storing calibration parameters into a non-volatile memory of each of the processing units.

15. The method of claim 14 further comprising a calibration process that occurs prior to operating the multi-view display,
wherein storing calibration parameters occurs as part of the calibration process.

16. The method of claim 10 wherein the method is also for displaying the displayable data, the method further comprising:
receiving, by the one or more multi-view pixels connected to each processing unit, the displayable data generated by the processing unit; and
emitting by each of the multi-view pixels a plurality of beamlets whose brightness and color are based on the displayable data.

* * * * *